(12) United States Patent
Schmitz et al.

(10) Patent No.: US 8,585,340 B2
(45) Date of Patent: Nov. 19, 2013

(54) FASTENING DEVICE OF A COVER ON A STATIONARY COMPONENT SITUATED IN THE FRONT AREA OF A MOTOR VEHICLE

(75) Inventors: Uwe Schmitz, Nauheim (DE); Joachim Schaefer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 13/081,194

(22) Filed: Apr. 6, 2011

(65) Prior Publication Data

US 2011/0250037 A1     Oct. 13, 2011

(30) Foreign Application Priority Data

Apr. 7, 2010 (DE) .................. 10 2010 014 079

(51) Int. Cl.
*F16B 21/00* (2006.01)
(52) U.S. Cl.
USPC ........... 411/512; 411/298; 411/301; 411/348; 411/511
(58) Field of Classification Search
USPC ......... 411/298, 301–302, 324, 342, 348, 511, 411/512
See application file for complete search history.

(56) References Cited

U.S. PATENT DOCUMENTS

| | | | | |
|---|---|---|---|---|
| 2,785,453 A | * | 3/1957 | Wentz | 24/662 |
| 3,210,105 A | * | 10/1965 | Vogt | 403/140 |
| 3,759,555 A | * | 9/1973 | Ito | 403/122 |
| 4,318,208 A | * | 3/1982 | Borja et al. | 24/305 |
| RE31,635 E | * | 7/1984 | Smith et al. | 403/144 |
| 6,077,011 A | * | 6/2000 | Walker | 411/348 |
| 6,206,604 B1 | * | 3/2001 | Dembowsky et al. | 403/135 |
| 7,082,919 B2 | * | 8/2006 | Nonogaki et al. | 123/198 E |
| 7,226,233 B2 | * | 6/2007 | SuBenbach et al. | 403/143 |
| 7,275,513 B2 | | 10/2007 | Nonogaki et al. | |
| 7,305,962 B2 | | 12/2007 | Nonogaki et al. | |
| 7,452,154 B2 | * | 11/2008 | Aoshima et al. | 403/122 |
| 7,470,081 B2 | * | 12/2008 | Miyahara et al. | 403/221 |
| 2004/0187838 A1 | | 9/2004 | Nonogaki et al. | |
| 2005/0217634 A1 | | 10/2005 | Nonogaki et al. | |
| 2006/0070599 A1 | | 4/2006 | Nonogaki et al. | |
| 2009/0242309 A1 | | 10/2009 | Krueger et al. | |

FOREIGN PATENT DOCUMENTS

| | | |
|---|---|---|
| DE | 102005014535 A1 | 10/2005 |
| DE | 102005046407 A1 | 4/2006 |
| EP | 1719670 A1 | 11/2006 |
| FR | 2852901 A1 | 10/2004 |
| FR | 2879149 A1 | 6/2006 |
| JP | 2007303375 A | 11/2007 |
| WO | 2007131497 A1 | 11/2007 |

OTHER PUBLICATIONS

British Patent Office, British Search Report for Application No. 1104503.6, dated Jul. 13, 2011.
German Patent Office, German Search Report for German Application No. 102010014079.1, dated Dec. 16, 2010.

* cited by examiner

*Primary Examiner* — Roberta Delisle
(74) *Attorney, Agent, or Firm* — Ingrassia Fisher & Lorenz, P.C.

(57) ABSTRACT

A fastening device is provided to cover below a front hood of a motor vehicle has an elastic fixing element for mounting a widened area implemented as a radial expansion of a shaft. When the cover is pressed down, the fixing element detaches from the widened area and arrives over the shaft. In this way, the fastening device is made yielding.

11 Claims, 4 Drawing Sheets

FASTENING DEVICE OF A COVER ON A STATIONARY COMPONENT SITUATED IN THE FRONT AREA OF A MOTOR VEHICLE

CROSS-REFERENCE TO RELATED APPLICATION

This application claims priority to German Patent Application No. 102010014079.1, filed Apr. 7, 2010, which is incorporated herein by reference in its entirety.

TECHNICAL FIELD

The technical field relates to a fastening device of a cover on a stationary component situated in the front area of a motor vehicle, having a first support element provided for fastening on the stationary component and having a second support element provided for fastening on the cover, one of the support elements having a shaft having a radial cross-sectional change and the other of the support elements having an elastic fixing element which engages in a formfitting manner on the cross-sectional change.

BACKGROUND

Fastening devices are used for various covers of an engine or an air filter, which are typically situated below a front hood of the motor vehicle, and are used for noise damping, for example. Such a fastening device is known, for example, from WO 2007/131497 A1. In this fastening device, the cross-sectional change is implemented as a constriction of the shaft. The elastic fixing element is made ring-shaped and lies in the constriction. The cross-section of the shaft is greater than the internal cross-section of the fixing element. If the support elements are compressed, the elastic fixing element is widened. The elastic fixing element subsequently rubs over the shaft or is destroyed. This fastening device has the disadvantage that after the removal of the elastic fixing element from the cross-sectional change, the force curve during the relative movement of the support elements rises. This results in a strong deceleration in the event of a head impact.

Therefore, an object is to design a fastening device of the type mentioned at the beginning in such a way that it permits the most precise possible predefinable force curve during a relative movement of the support elements. In addition, other objects, desirable features and characteristics will become apparent from the subsequent summary and detailed description, and the appended claims, taken in conjunction with the accompanying drawings and this background.

SUMMARY

A cross-sectional change is implemented as a radial widened area of the shaft, and the elastic fixing element presses against the outer periphery of the widened area. This design prevents the elastic fixing element from being widened during the movement over the shaft. This primarily results in a significant reduction of the danger of destruction of the elastic fixing element. Furthermore, the friction of the elastic fixing element on the shaft may thus be kept low. The force curve during the relative movements of the support elements may thus be kept at a low level.

A friction of the fixing element on the shaft may be easily avoided according to another advantageous refinement of the invention if the elastic fixing element is spaced apart from the shaft in a position separate from the widened area. Through this design, the fastening device is capable of holding the cover as long as the fixing element presses against the widened area. If forces arising in the event of a head impact exceed the holding forces of the elastic fixing element on the widened area, the support elements may be shifted in relation to one another without force.

The limiting of the movement range of the support elements is made particularly simple according to another advantageous refinement of the invention if the two support elements are movable from a first position, in which the elastic fixing element is connected to the widened area, into a second position, in which one of the support elements presses against a stop.

According to an embodiment, the fastening device has a high stability when the elastic fixing element is situated in a receptacle part.

According to another embodiment, the fastening device has a particularly compact design if the stationary component mounts the shaft and has the stop and if the stop supports the receptacle part mounting the elastic fixing element.

Load peaks during the removal of the fastening device may be easily avoided according to another advantageous refinement of the invention if the cover mounting the receptacle part has an open or closed recess for receiving the widened area in the position of the receptacle part pressing against the stop.

According to an embodiment, the fastening device has a particularly simple design formation if the widened area is made conical and the elastic fixing element has elastically pretensioned shells. According to another embodiment, the support elements may be plugged together easily after a separation if the elastic fixing element has an insertion funnel facing toward the widened area.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
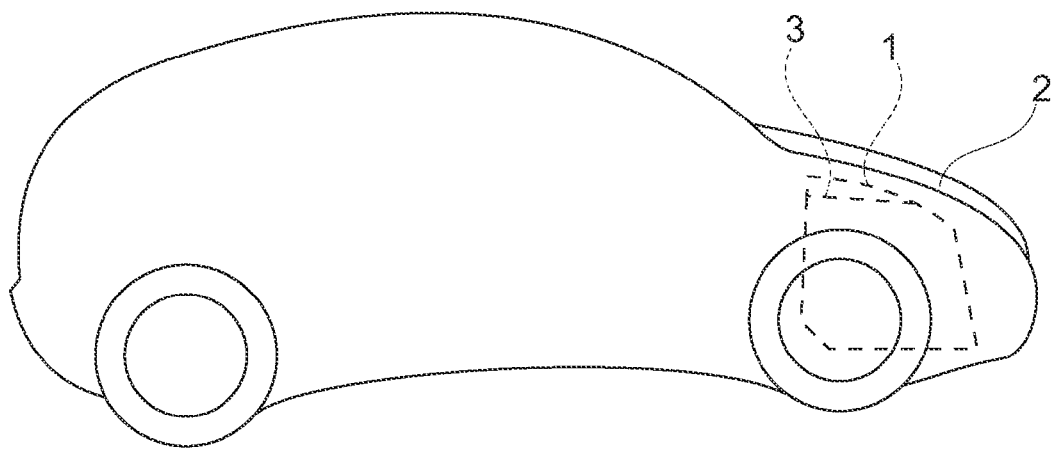
FIG. 1 shows a motor vehicle having a cover situated under a front hood.

FIG. 1 shows a motor vehicle having a drive unit 1 and a front hood 2. A cover 3 is situated on the side of the drive unit 1 facing toward the front hood 2. The cover 3 can be provided for the drive unit 1 or an air filter of the drive unit 1 or can be part of a housing situated below the front hood 2. The drive unit 1 can have an internal combustion engine (not shown) or an energy store for an electrical drive of the motor vehicle.

Figure 2A:
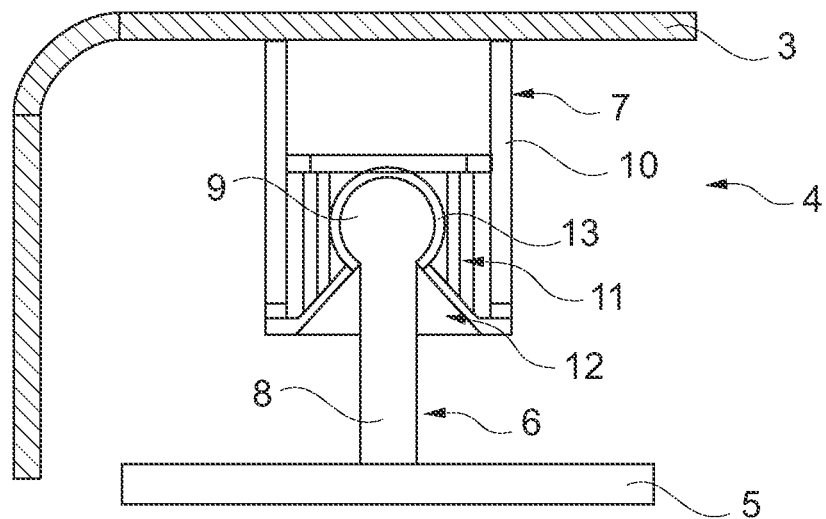
FIGS. 2a, 2b show a greatly enlarged sectional view of a fastening device of the cover from FIG. 1 in the base state and after being pressed down.

FIG. 2a shows an enlarged view of a fastening device 4 of the cover 3 on a stationary component 5 in a first position, in which the cover 3 is supported by the fastening device 4. The stationary component 5 can be the drive unit 1 shown in FIG.

1, for example. The fastening device 4 has a first support element 6 connected to the stationary component 5 and a second support element 7 connected to the cover 3. The first support element 6 has a shaft 8 having a spherical widened area 9, which is situated on the free end and is implemented as a radial expansion. The second support element 7 has an elastic fixing element 11 situated in a receptacle part 10, which presses against the outer periphery of the widened area 9 in the first position of the fastening device 4. The support elements 6, 7 are thus connected to one another in a friction-locked way. The elastic fixing element 11 has an insertion funnel 12 for the insertion of the widened area 9 and shells 13 which are pre-tensioned against the widened area 9.

Figure 2B:
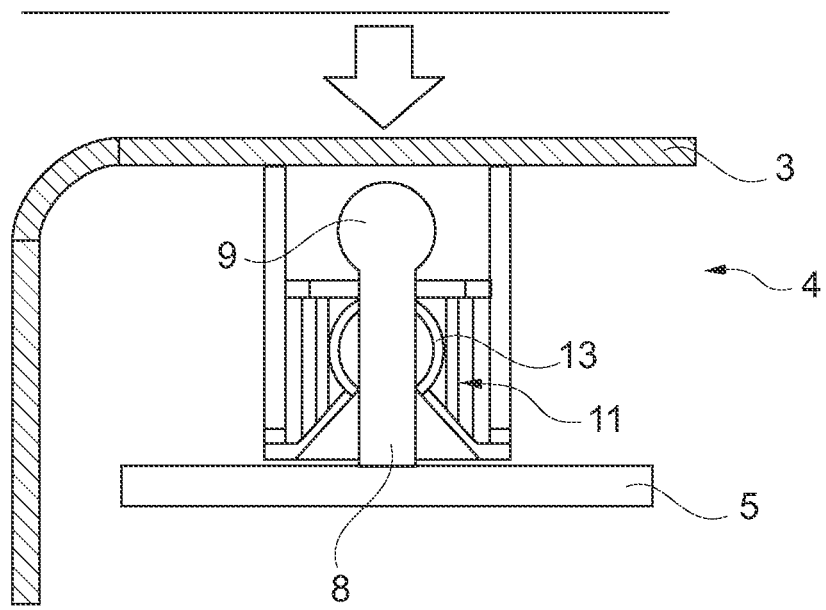

In the event of a head impact of a pedestrian on the front hood 2 shown in FIG. 1, the front hood 2 is deformed and reaches the cover 3. The cover 3 is pressed down, as shown in FIG. 2b. The fastening device 4 reaches a second position here, in which the friction-locked connection of the fixing element 11 is separated from the widened area 9. The elastic fixing element 11 is opposite to the shaft 8 here. Since the shaft 8 has a smaller cross-section than the widened area 9, the fixing element 11 is spaced apart from the shaft 8 in this position. The stationary component 5 has a stop 14, on which the receptacle part 10 is supported in the second position of the fastening device 4.

The shaft 8 and the widened area 9 are made rotationally symmetrical. Correspondingly, the shells 13 are either ring-shaped, made adapted to the shape of the widened area 9, or composed of individual shell parts situated over the periphery of the widened area 9.

Figure 3A:
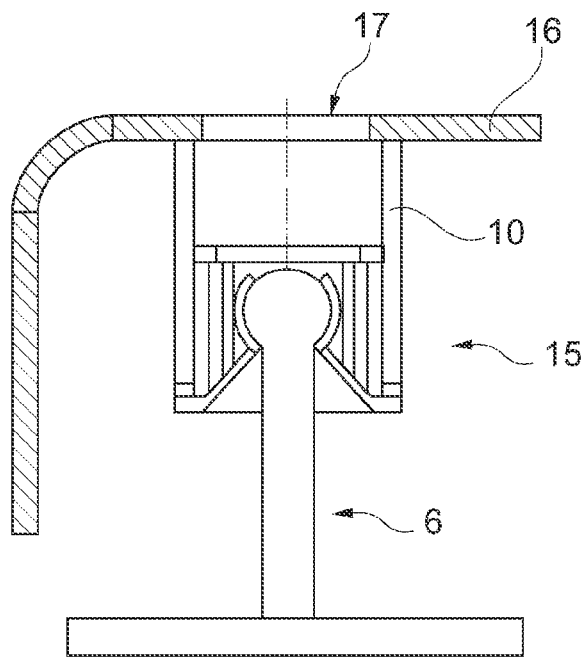
FIGS. 3a, 3b show an enlarged sectional view of a further embodiment of the fastening device of the cover from FIG. 1 in the base state and after being pressed down.
Figure 3B:
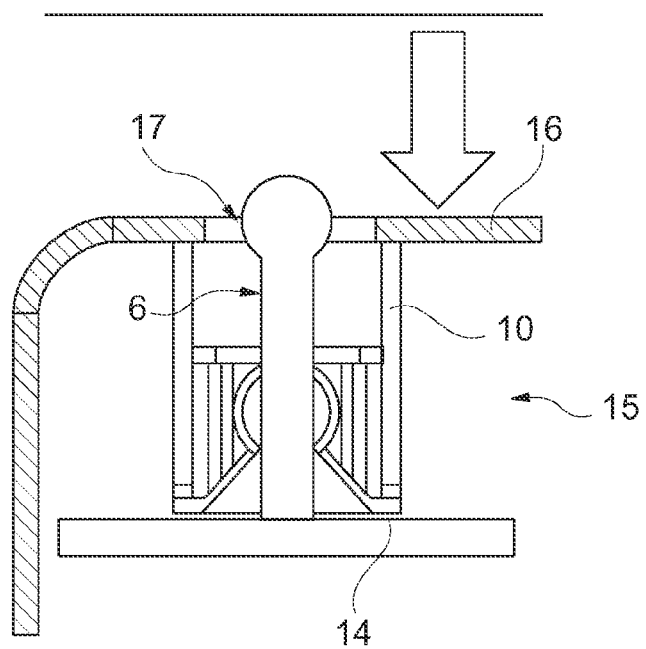

FIG. 3a and FIG. 3b show the two positions, corresponding to FIG. 2a and FIG. 2b, of a fastening device 15, which only differs from that in FIGS. 2a and 2b in that a cover 16 has an open recess 17 for the passage of the first support element 6 in the second position of the fastening device 15. Otherwise, the fastening device 15 shown here is constructed like that shown in FIG. 2a and FIG. 2b.

Figure 4A:
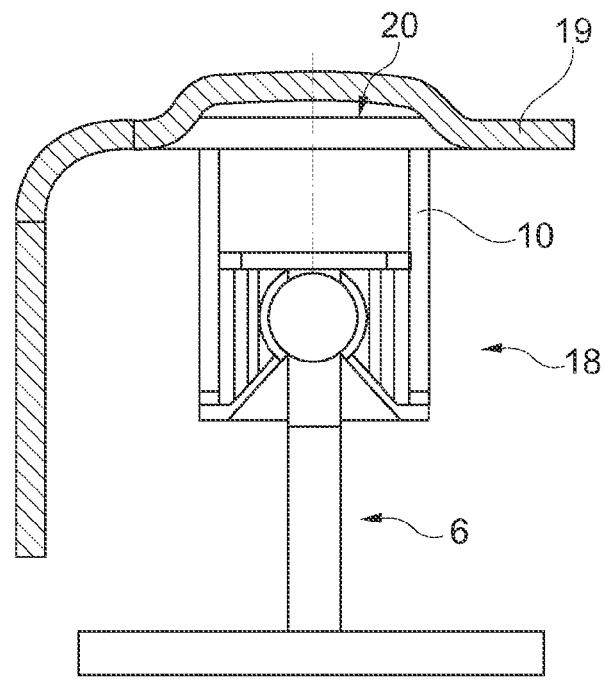
FIGS. 4a, 4b show an enlarged sectional view of a further embodiment of the fastening device of the cover from FIG. 1 in the base state and after being pressed down.
Figure 4B:
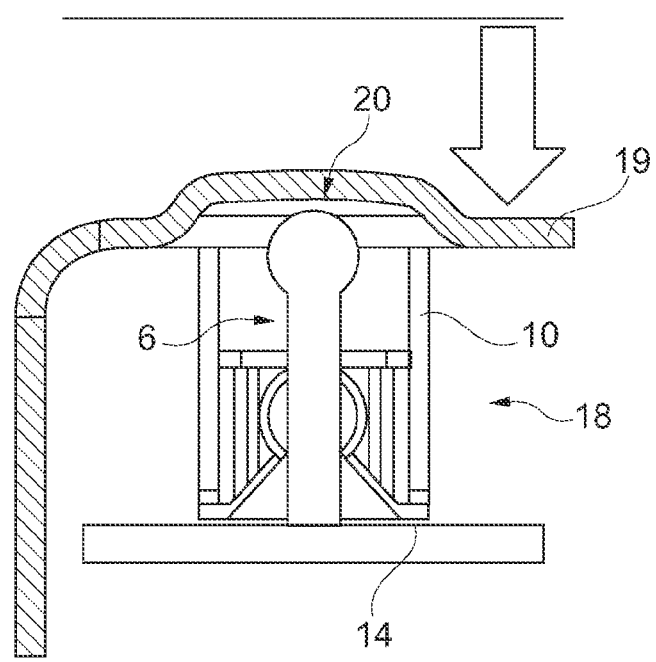

FIG. 4a and FIG. 4b shows the two positions corresponding to FIG. 2a and FIG. 2b of a fastening device 18, which differs from that in FIG. 2a and FIG. 2b only in that a cover 19 has a closed recess 20 for receiving the free end of the first support element 6 in the second position. Otherwise, the fastening device 18 shown here is constructed like the device shown in FIG. 2a and FIG. 2b.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fastening device of a cover on a stationary component situated in a front area of a motor vehicle, comprising:
   a first support element configured to fasten on the stationary component;
   a second support element configured to fasten on the cover:
   a support element shaft having a radial cross-sectional change; and
   an elastic fixing element is configured to engage in a form-fitting way on the radial cross-sectional change,
   wherein the radial cross-sectional change is a radial widened area of the support element shaft, and
   wherein the elastic fixing element presses against an outer periphery of the radial widened area when the first support element and the second support element are in a first position, at least the second support element movable from the first position to a second position, and the elastic fixing element is spaced apart from the support element shaft so as to not contact the support element shaft when the second support element is in the first position.

2. The fastening device according to claim 1, wherein the first support element is movable from the first position into a second position.

3. The fastening device according to claim 2, wherein in the second position the first support element is configured to press against a stop.

4. The fastening device according to claim 3, wherein the elastic fixing element is situated in a receptacle part.

5. The fastening device according to claim 4, wherein the stationary component mounts the support element shaft and has the stop, and the stop supports the receptacle part mounting the elastic fixing element.

6. The fastening device according to claim 4, wherein the cover mounting the receptacle part has a recess that receives the radial widened area in a position of the receptacle part pressing against the stop.

7. The fastening device according to claim 6, wherein the recess is defined through the cover mounting and open such that the radial widened area extends at least partially above a surface of the cover mounting when the receptacle part presses against the stop.

8. The fastening device according to claim 6, wherein the recess is closed.

9. The fastening device according to claim 2, wherein in the second position the second support element is configured to press against a stop.

10. The fastening device according to claim 1, wherein the radial widened area is spherical and the elastic fixing element has elastically pre-tensioned shells.

11. The fastening device according to claim 1, wherein the elastic fixing element has an insertion funnel facing toward the radial widened area.

* * * * *